Figure 1:
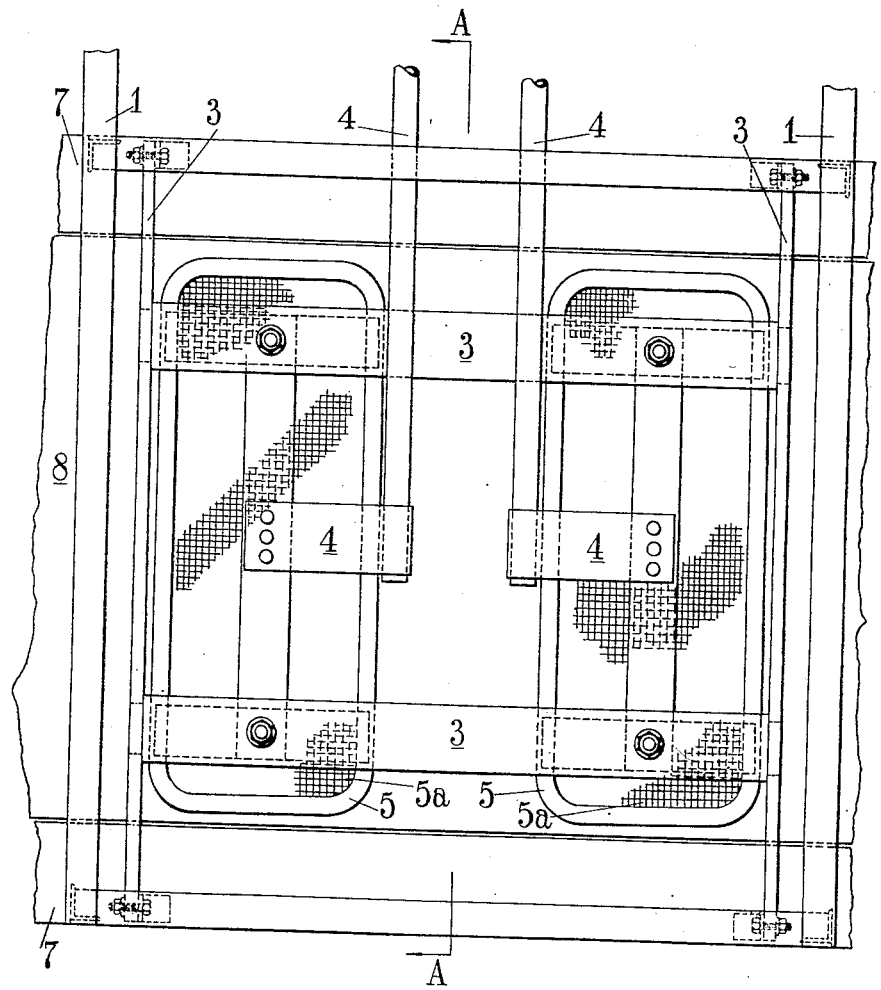

Dec. 25, 1951 — W. J. SHRIMPTON — 2,580,200
PRODUCTION OF CONTINUOUS WEB OR LENGTH OF SHEET MATERIAL
Filed Aug. 7, 1947 — 3 Sheets-Sheet 2

INVENTOR
W. J. SHRIMPTON
ATTYS.

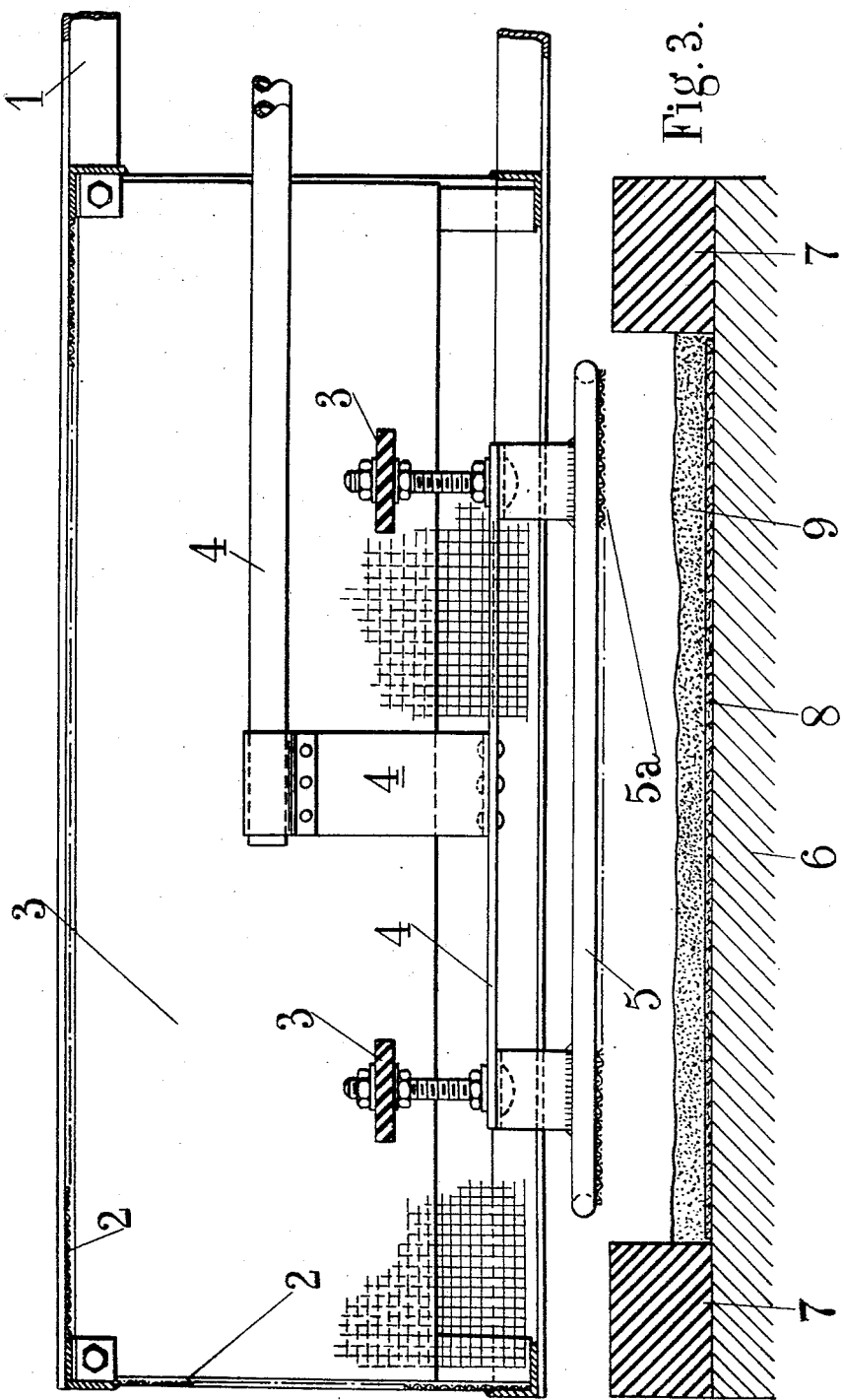

Patented Dec. 25, 1951

2,580,200

UNITED STATES PATENT OFFICE 2,580,200

PRODUCTION OF CONTINUOUS WEB OR LENGTH OF SHEET MATERIAL

William John Shrimpton, London, England, assignor to British Artificial Resin Company Limited, London, England Application August 7, 1947, Serial No. 767,256
In Great Britain January 5, 1946

3 Claims. (Cl. 18—47.5)

This invention relates to the manufacture of non-metallic material of the kind indicated below in the form of a continuous web or long sheet (hereinafter referred to as "web material") which during its production or finishing requires heat treatment. The material to be produced or treated includes bodies of or compositions incorporating thermosetting plastics, thermoplastics (hereinafter called plastics), in a comminuted or powdered layer.

Materials of the above character possess more or less poor heat conductivity and the practice in manufacture hitherto has been to employ a static heat treatment and pressure between platens of a press, the transfer of heat according to this method being by the relatively slow process of conduction and consequently the production rate was low. Owing to this slow conductivity factor, the heat treatment of travelling material in continuous webs or long sheets has received little attention in industry and has not been developed.

Some success has been achieved in expediting heat treatments of relatively small sheets by a method which does not depend upon conductivity but upon a current capacity effect, employing the material to be treated as a dielectric between electrodes charged with high frequency currents. This high frequency heat treatment has been confined for production purposes to what may be called a batch treatment where moulding powders or laminated sheets were subjected to the high frequency effects under static conditions, although webs of material have been seamed together by heat welding (by high frequency currents) the overlapping edges of the webs in lieu of machine stitching.

It will be appreciated that while this high frequency or current capacity heating under static conditions may have afforded an increase in the rate of production or effectiveness of the heat treatment as compared with the conduction heating, it still possessed the limitations inherent to the batch or static sheet treatment in presses.

According to the present invention an improved method of and means for manufacturing web material or layers of the kind indicated is provided, utilising radio or high frequency currents as a heating medium with a view to securing the advantages of this type of heating, among which may be instanced eliminating the dependence upon heat transference contacts, the production of a more uniform product and expedition in the rate of production not only by an increase in the heating rate but by enabling an increase in the content of accelerator or catalyst to be employed.

In one application of the invention high frequency heat treatment is utilised, particularly as directed to relatively thick web material, as an antecedent to heating by conduction and/or radiation while the web material is under pressure in the continuous process, with a view to establishing an even distribution of heat through the body of web material and partial curing or like effect before it is subjected to conduction or radiant heat.

The invention consists in continuously traversing web material between or under electrodes connected to a source of high frequency current thereby imparting heat evenly throughout the continuously traversing material.

The invention also consists in continuously traversing web material between or under electrodes connected to a source of high frequency current thereby imparting heat evenly throughout the continuously traversing web material, and consolidating or gauging the material in continuous transit between pressure applying means.

The invention also consists in continuously traversing web material between or under electrodes connected to a source of high frequency current thereby imparting heat evenly throughout the continuously traversing material, as a preheating treatment of the web material, and subsequently subjecting the web material in continuous transit to pressure and heat by conduction and/or radiation, with a view to effecting a substantial proportion of curing or like action by the heat of the high frequency treatment which is maintained or further raised by thermal conduction in the pressure stage.

The invention also consists in a method as set forth in either of the last two preceding paragraphs wherein the pressure or pressure and conduction or radiation heat treatment is followed by a further high frequency heat treatment.

The invention further comprises means for carrying out the above methods wherein web material is subjected on a continuously travelling metal band or support which constitutes an earthed element of the high frequency system, having a superposed longitudinally extending high frequency electrode (or electrodes) under which the web material is passed.

In carrying the invention into effect for the heat treatment of a layer of comminuted material, a steel band conveyor is mounted on terminal rollers with intermediate guide rollers or tracks for affording support between the terminal rollers, the conveyor rollers being carried in a suitable frame and driven by appropriate means to pass the material upon the band forwardly to pressure applying means. Bridging means may be provided between the adjacent terminal conveyor roller and the feed end of the pressure applying means.

Over the steel band a pair of high frequency electrodes is connected to an oscillator coil or is otherwise connected to an oscillatory circuit for the known high frequency method. These electrodes extend longitudinally to cover the desired longitudinal high frequency heating zone. Alternatively the zone may comprise a plurality of pairs of longitudinally spaced electrodes. The steel band is earthed so that a high frequency heating field or fields is or are established transversely of the layer or web material.

Figure 2:
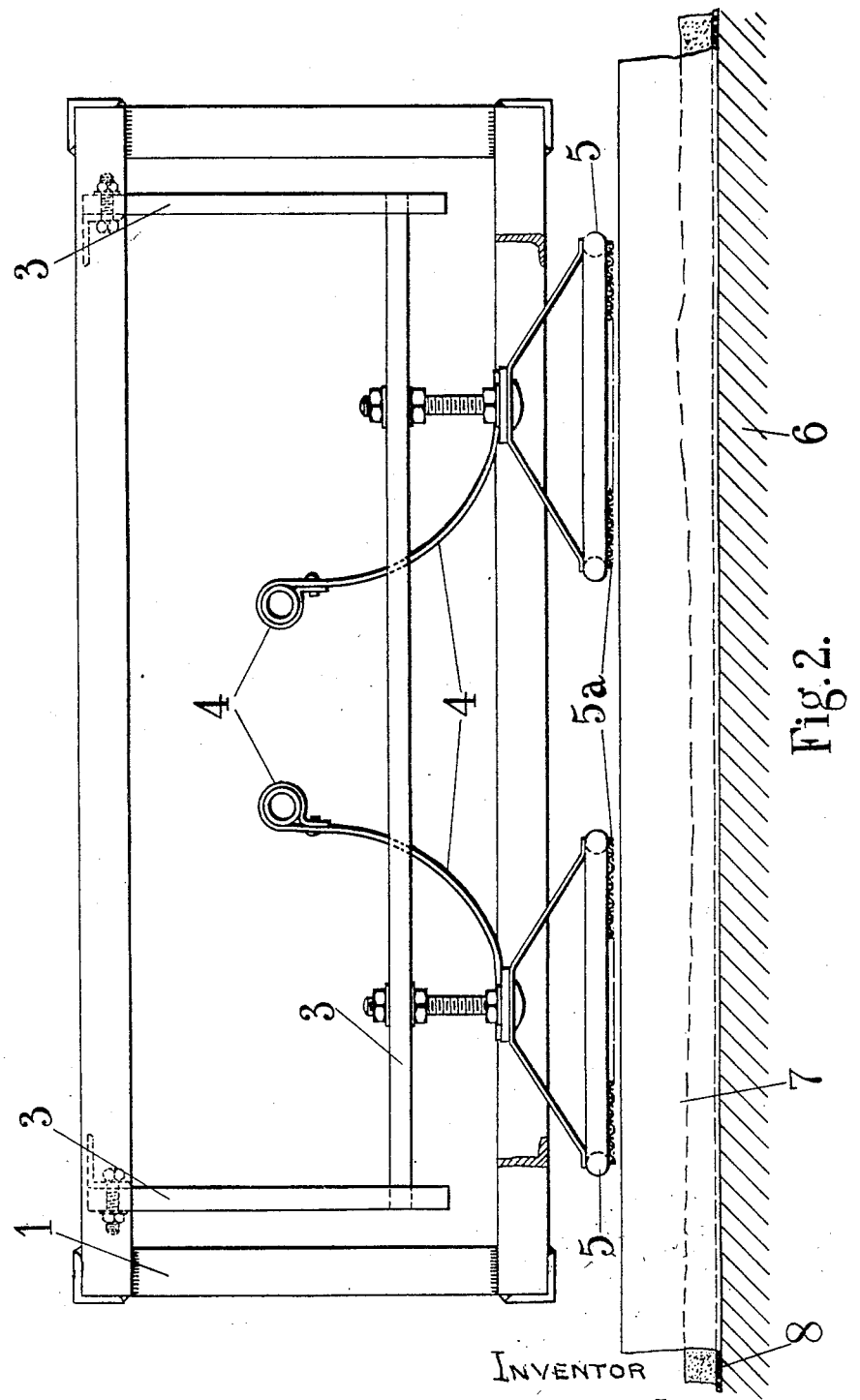

Referring to the accompanying drawings which illustrate an arrangement by which the invention may be carried into effect:

Figure 1 is a plan view;

Figure 2 a side elevation, and

Figure 3 a sectional elevation on line A'—A' of Figure 1.

In these figures, in which like numerals refer to like parts, 1 represents the members of a supporting framework for the electrodes, the framework being in turn supported and mounted on the housing of a high frequency oscillator of conventional type (not shown).

The framework 1 supports a pair of electrodes 5, which are mounted on insulating members 3 which may be of the material known under the registered trade-mark Mycalex or any other suitable insulating material. The electrodes 5 are made up of a tubular metal frame and a metal gauze facing sheet 5a, and are protected at the top and sides by wire mesh screens 2, shown in Figure 3. High frequency current is supplied to the electrodes by conductors 4, the electrodes being positioned as shown over the metal conveyor band 8 which is earthed and supported by the metal bed 6.

The metal conveyor band 8 is mounted on pulleys at either end (not shown), and is driven by any convenient means in the usual way.

The material 9 under heat treatment, which may be a moulding material alone or supported on a fabric or paper layer, is fed to the conveyor band by any convenient means, and on each side of the conveyor band members 7 of insulating material such as Mycalex are provided, which prevent the material under treatment from spreading beyond the width of the conveyor band. The moulding material is gauged to the desired thickness by any convenient means such as a roller superposed over the material.

The following illustrates, by way of example, how the process may be operated:

The moulding material 9, which is to undergo preliminary heat treatment prior to consolidation by pressure and heat, consists of a mixture of 80 parts of sawdust (moisture content 5%) and 20 parts of finely powdered cresol-formaldehyde resin. The resin is a normal product of cresol condensed in one stage with formaldehyde in the presence of an alkaline catalyst.

The moulding material is fed from a hopper on to the conveyor band 8, in the form of a loose carpet, approximately 1½ inches deep and 18 inches wide, moving under the electrodes at a steady rate of 14 inches per minute. There is an air gap between material and electrodes of not less than ½ inch.

The electrodes are placed as close as possible to the succeeding pressure members, so that the moulding material receives the pressure as soon as possible after being heated in order not to "cure" appreciably before the moulding pressure is applied.

The electrodes are supplied with high frequency current under the following conditions:

Frequency _____ 13 to 15 megacycles per sec.
Voltage to anode of oscillator 4,500
Current in oscillator_____ 0.6 amp.

This gave a temperature rise of the moulding material of about 40° C., and the quantity of material heated was about 2.7 lbs. per minute.

It will be understood that the above arrangement may be modified.

For example, in another form the electrodes are positioned on each side of the material and are also longitudinally spaced affording a staggered arrangement so that the material is traversed both transversely and longitudinally by the electrode fields.

I claim:

1. A continuous method of forming a compressed sheet having the character of wood, which comprises mixing a comminuted fibrous material with a quantity of a thermosetting plastic in unset condition sufficient to produce a plastic bond, continuously forming a thick layer of said mixture in uncompacted form on a moving band, passing the band with its uncompacted layer through a high frequency electric field to heat the resin sufficiently to cause the plastic to permeate the fibrous material and partially to set, then immediately passing the so-heated layer while still on said band into and through a second heating and pressure zone wherein the layer is directly heated by conduction to curing temperatures and compacted under pressure into its final form.

2. The process of claim 1 wherein the layer of fibrous material and plastic is fed to said moving band supported on a fabric layer.

3. The process of claim 1 wherein said moving band is a metal band and is grounded forming an earthed element of the high frequency heating circuit.

WILLIAM JOHN SHRIMPTON.

REFERENCES CITED

The following references are of record in the file of this patent:

UNITED STATES PATENTS

| Number | Name | Date |
|---|---|---|
| 2,167,440 | Mason | July 25, 1939 |
| 2,230,880 | Brown | Feb. 4, 1941 |
| 2,280,771 | Dufour et al. | Apr. 28, 1942 |
| 2,288,269 | Crandell | June 30, 1942 |
| 2,296,948 | Pitman | Sept. 29, 1942 |
| 2,319,174 | Wilson | May 11, 1943 |
| 2,324,068 | Crandell | July 13, 1943 |
| 2,423,915 | Wacker | July 15, 1947 |
| 2,433,067 | Russell | Dec. 23, 1947 |
| 2,463,289 | Leguillon | Mar. 1, 1949 |
| 2,480,851 | Goss | Sept. 6, 1949 |

FOREIGN PATENTS

| Number | Country | Date |
|---|---|---|
| 365,536 | Great Britain | Jan. 18, 1932 |
| 517,798 | Great Britain | Feb. 8, 1940 |